United States Patent [19]

Moreau et al.

[11] Patent Number: 5,613,116
[45] Date of Patent: Mar. 18, 1997

[54] SYSTEM FOR SPECIFYING INTERACTIONS AMONG OBJECTS IN A DIGITAL DATA PROCESSING SYSTEM

[75] Inventors: Ken Moreau; Bradley A. Becker, both of Nashua, N.H.; Don A. Carignan, Tyngsboro; Jeff M. Diewald, Billerica, both of Mass.; Kevin B. Routley, Nashua; Jim Wooldridge, Amherst, both of N.H.

[73] Assignee: Digital Equipment Corporation, Maynard, Mass.

[21] Appl. No.: 954,407

[22] Filed: Sep. 29, 1992

Related U.S. Application Data

[63] Continuation of Ser. No. 378,868, Jul. 12, 1989, abandoned.

[51] Int. Cl.$^6$ .................................................. G06F 9/40
[52] U.S. Cl. .............................................................. 395/326
[58] Field of Search ..................................... 395/650, 700, 395/600

[56] References Cited

U.S. PATENT DOCUMENTS

| | | | |
|---|---|---|---|
| 4,558,413 | 12/1985 | Schmidt et al. | 364/200 |
| 4,723,209 | 2/1988 | Hernandez et al. | 364/300 |
| 4,853,843 | 8/1989 | Ecklund | 395/600 |
| 5,008,853 | 4/1991 | Bly et al. | 364/900 |
| 5,185,885 | 2/1993 | Dysart et al. | 395/600 |
| 5,421,015 | 5/1995 | Khoyi et al. | 395/650 |

*Primary Examiner*—Kevin A. Kriess
*Assistant Examiner*—John Q. Chavis
*Attorney, Agent, or Firm*—David A. Dagg; Denis G. Maloney; Arthur W. Fisher

[57] ABSTRACT

A digital computer system having a prototype list, an activation identifier, and a control portion. The prototype list having a plurality of entries each associated with a prototype object, at least some entries including an interaction list for specifying prototype objects and actions. The activation identifier identifies activation of an instance of an object; and the control portion is responsive to the identification, by the action identifier, of activation of an object for performing operations on objects as-identified by the interaction list of a prototype entry associated with the instance of the activated object.

5 Claims, 3 Drawing Sheets

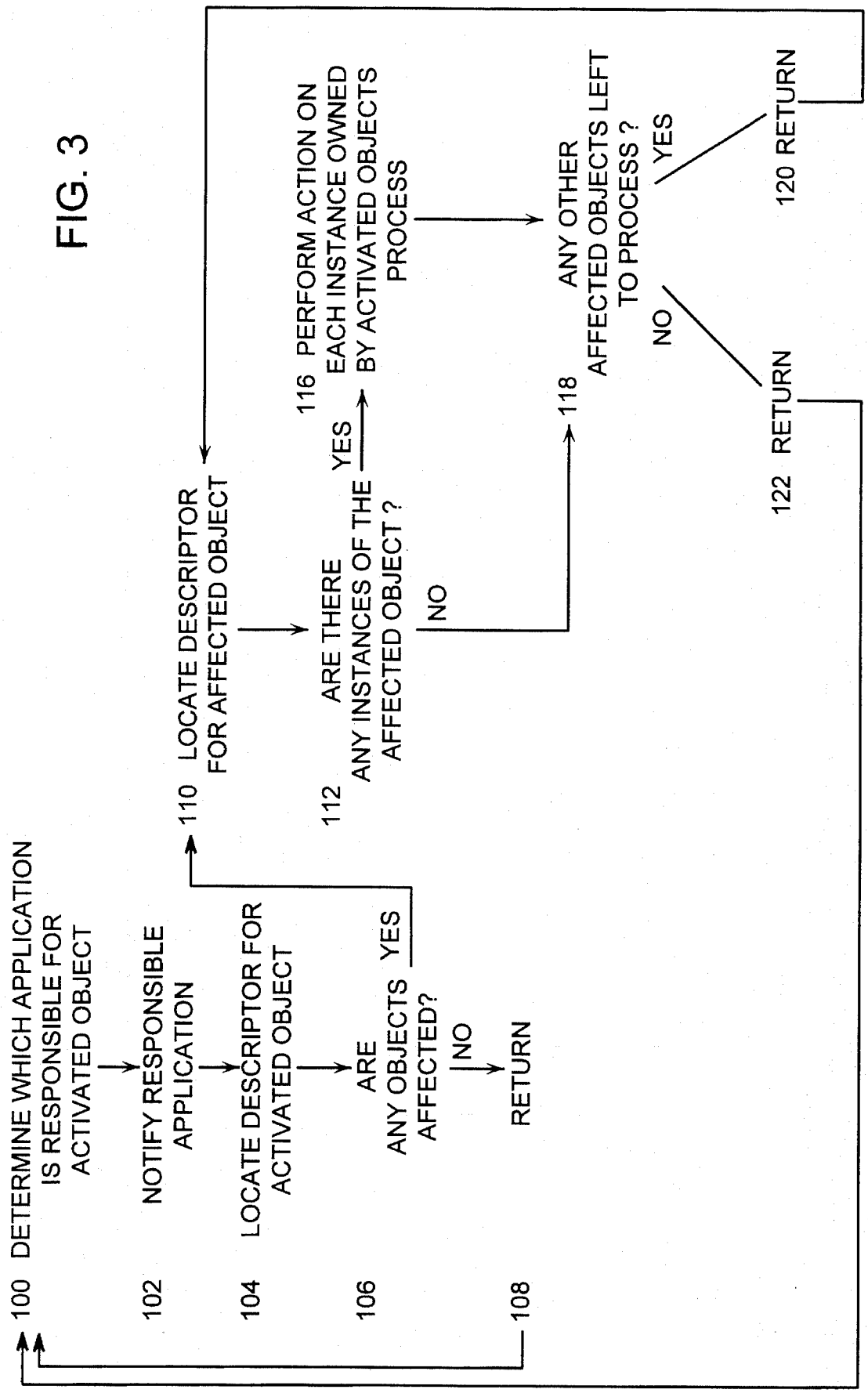

SYSTEM FOR SPECIFYING INTERACTIONS AMONG OBJECTS IN A DIGITAL DATA PROCESSING SYSTEM

This is a continuation of application Ser. No. 07/378,868, filed Jul. 12, 1989, now abandoned.

FIELD OF THE INVENTION

The invention relates generally to the field of digital data processing systems, and more specifically to digital data processing systems in which a number of objects are defined and in which the processing of one of the objects may affect others of the objects.

BACKGROUND OF THE INVENTION

One type of software application uses a number of "windows", that is, sections of a display screen, to present a user with various operations he can perform. Typically, in each window a user can initiate one or more operations by means of, for example, a single menu option or a group of menu options, and each operation is represented by an object. Each window, therefore, is associated with or contains a number of objects which the user can activate in some way to initiate execution of the various operations. For example, the user can activate an object, to initiate execution, by clicking on it with a mouse, or by entering a command (keystrokes) in a text field associated with the object.

Within such an application, it is desirable to make the application user friendly. One way to do this is to alert the user to operations that the application will or will not allow at a given point. For example, if the user activates one object/operation the activation can preclude or enable the option of activating another object/operation. To alert the user to the object interaction taking place, it is known for the application to "gray" the affected object, e.g., lighten its display on the screen, to indicate that its associated operation is unavailable. Conversely, the activation of one object may enable other objects in the window. For example, the activation of an object may cause the application to generate another window (a child window) containing more objects/operations from which to choose.

Previously, the conditions and actions necessary to accomplish these and other object interactions were coded in separate procedures for each instantiation or actual occurrence of each object in the system. These procedures were typically duplicative and error prone.

SUMMARY OF THE INVENTION

In brief summary, the invention provides, in one aspect, a digital computer system comprising a prototype list, an activation identifier, and a control portion. The prototype list comprises a plurality of entries each associated with a prototype object, at least some entries including an interaction list for specifying prototype objects and actions. The activation identifier identifies activation of an instance of an object, and the control portion responsive to identification, by the activation identifier, of activation of an object for performing operations on objects as identified by the interaction list of a prototype entry associated with the instance of the activated object. In another aspect, the invention provides a program for controlling a digital processor. The program includes an activation identifier module for enabling the processor to identify the activation of an instance of an object, and a control portion module for enabling the processor, in response to identification, during processing of the action identifier module, of activation of an object to perform operations on objects as identified by an interaction list of a prototype entry in a prototype list associated with the instance of the activated object. In yet another aspect, the invention provides a method of controlling digital computer system. In the method, a prototype list is provided comprising a plurality of entries each associated with a prototype object, at least some entries including an interaction list for specifying prototype objects and actions. Thereafter, activations of instances of objects are identified and, in response to each activation of an instance of an object, operations are performed on objects as identified by the interaction list of a prototype entry associated with the instance of the activated object.

BRIEF DESCRIPTION OF THE DRAWINGS

FIG. 3 shows the general operation of the system in flowchart form.

DESCRIPTION OF A PREFERRED EMBODIMENT

Figure 1:
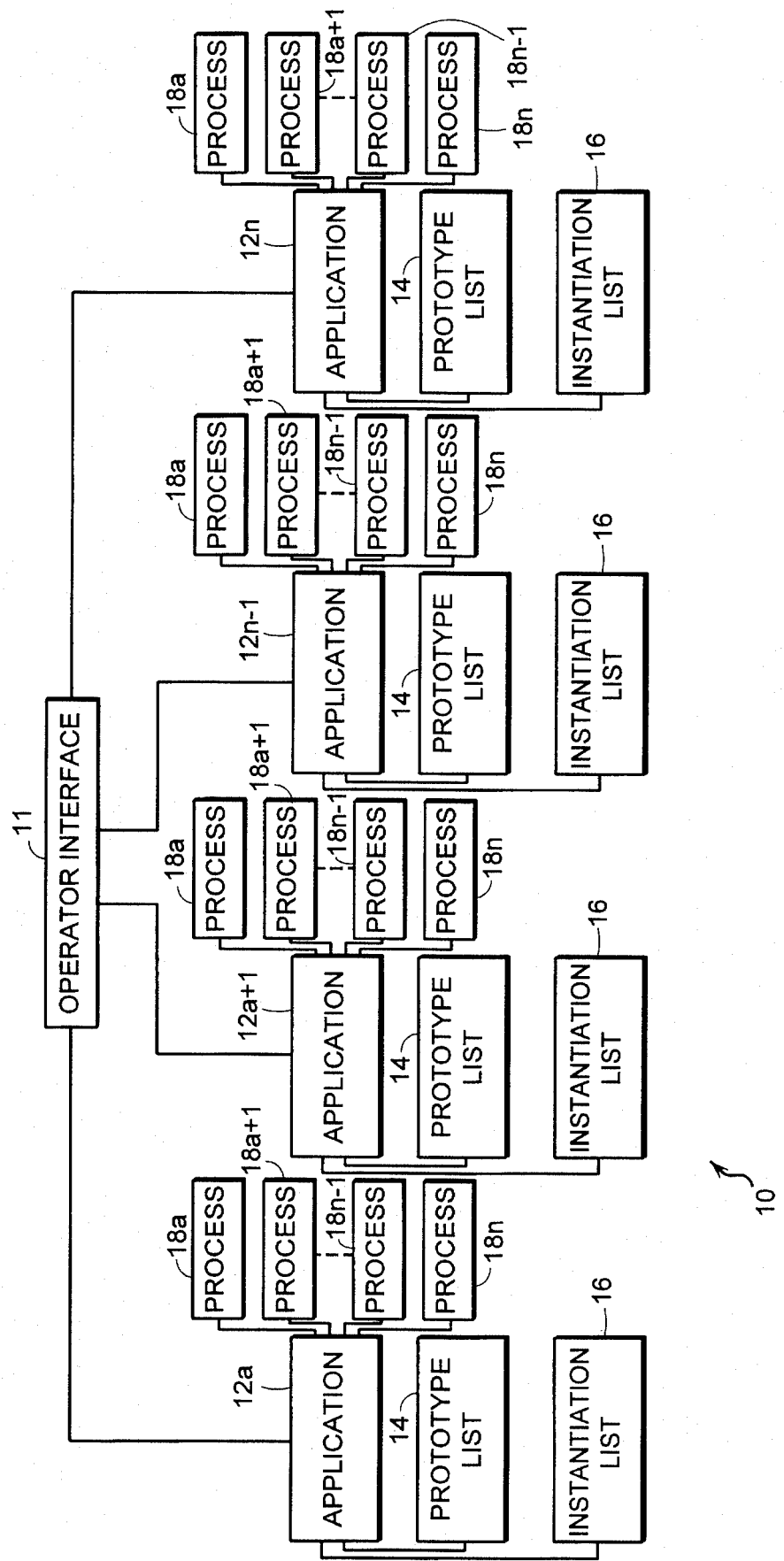
FIG. 1 shows a system according to the present invention.

The present invention provides an arrangement, including a system and method, for specifying interactions among objects in a digital data processing system.

In a software application using a windowed environment, there are potentially many types of objects that can interact. Such types of objects include, for example, windows, dialog boxes, menus, menu entries, icons, and scroll bars. For example, an interaction between objects occurs if a user activates a menu entry and the resulting operation affects other menu entries, causing the application to "gray" or "ungray" the affected entries to indicate that the operations associated with them are unavailable or available to the user.

The task of specifying these and other object interactions is made difficult by several conditions. First, a data processing system can support a number of concurrent applications, each of which can operate in a windowed environment. And second, an application can support a number of processes, each of which can generate and, thus, it is said to "own" independent instantiations of types of windows and objects. Because of these possibilities, it is likely that an object will occur a number of times within a system, making it difficult to distinguish between particular instantiations of the objects and to determine the resulting interactions between them. For example, there may be several instantiations of the same dialog box present at once in a system, each owned first by a particular application and then also owned by a particular process within that application.

In addition, a third difficulty arises because an object is activated when it is initialized, i.e., when it is first created and before it is displayed on the screen, as well as when it is refreshed, i.e., when it changes because of an interaction with another object. Interactions resulting from these non-user initiated activations must be specified also.

One feature of the present invention, the prototype object record, in part, relieves the difficulty of distinguishing between instantiations of objects by classifying objects under a number of prototypes. For example, all instances of a dialog box fall into a category defined by a dialog box prototype descriptor. A second feature of the present invention, the interaction record, further distinguishes instances of objects by associating a number of prototype interactions with each prototype object, the prototype interactions being performed if the prototype object is activated.

Thus, a prototype descriptor defines a type of object, and an interaction record specifies these types of interactions, that is, the interaction to be performed on other types of objects defined by other prototype descriptors. As described in detail below, the present invention efficiently links these types of objects with their actual instantiations and makes it possible to provide only one procedure, rather than duplicative procedures, to accomplish each interaction. A detailed description of the components of the system and its operation follows.

Referring to FIG. 1, in a data processing system 10, an operation is input through an operator interface 11. One such operation is the activation of an object, for example, clicking on a menu entry, in one of a number of applications 12a–12n each displaying multiple objects. Because the activation of the object may result in interactions with other objects, for example, other menu entries, the operator interface 11, in response to the activation, determines which application 12 owns this particular instantiation of the activated object and notifies it of the activation. Following this, the application 12 determines which of its processes 18a–18n owns the instantiation of the activated object, and performs the interactions which may be specified in the interaction list.

Note that the application 12 referred to here is one of software applications 12a–12n, generally referred to by reference numeral 12, and that the process 18 referred to here is one of the processes 18a–18n associated with each application 12. The applications 12 interact with the operator interface 11 and support the processes, each of which can generate and, thus, "own" objects.

In response to the notification that an instantiation of an object has been activated, the application 12 first locates a prototype descriptor 20 for the activated object in the prototype list 14. As discussed above, the prototype descriptors 20 generically identify both the object and its interactions with other objects. Each object incorporated by the application 12 is defined by a prototype descriptor 20 and each application maintains its own prototype list 14 for defining the objects it owns. As described below in connection with FIG. 2a, each prototype descriptor 20, in turn, contains one or more interaction records which identify other prototype descriptors 20 and the actions to perform on them. A detailed discussion of the data structures and the operations performed to carry out these interactions follows.

Figure 2A:
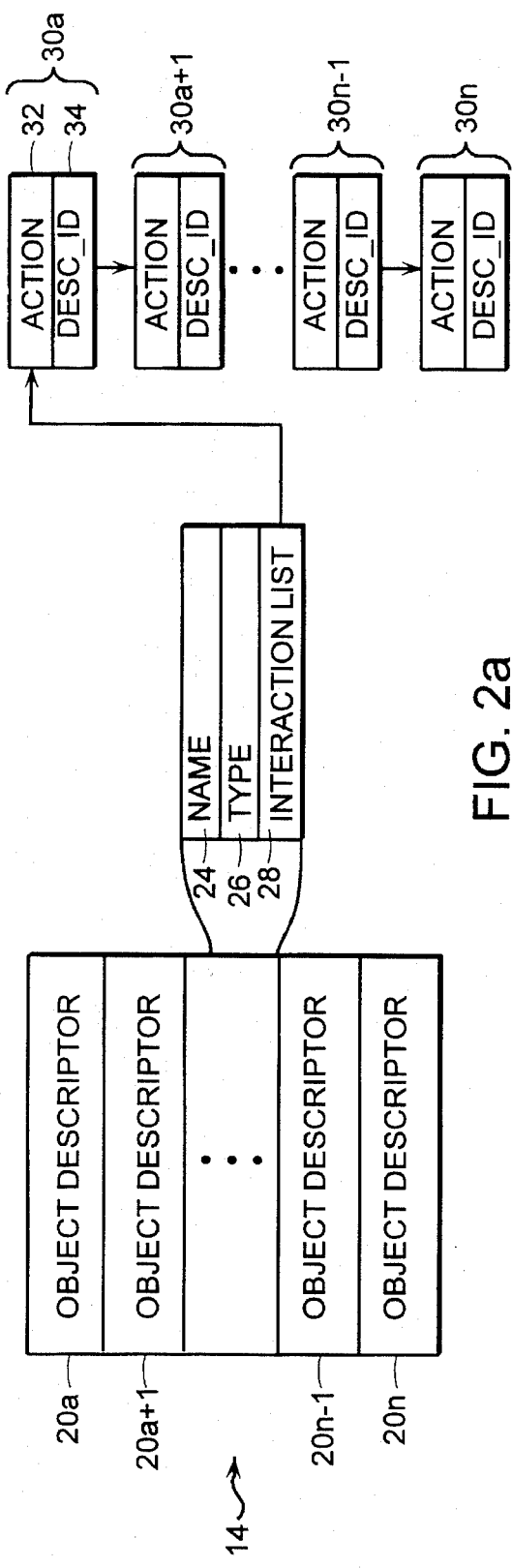
FIGS. 2a and 2b show data structures used by the system, including a prototype object list and instantiation of objects list.
Figure 2B:
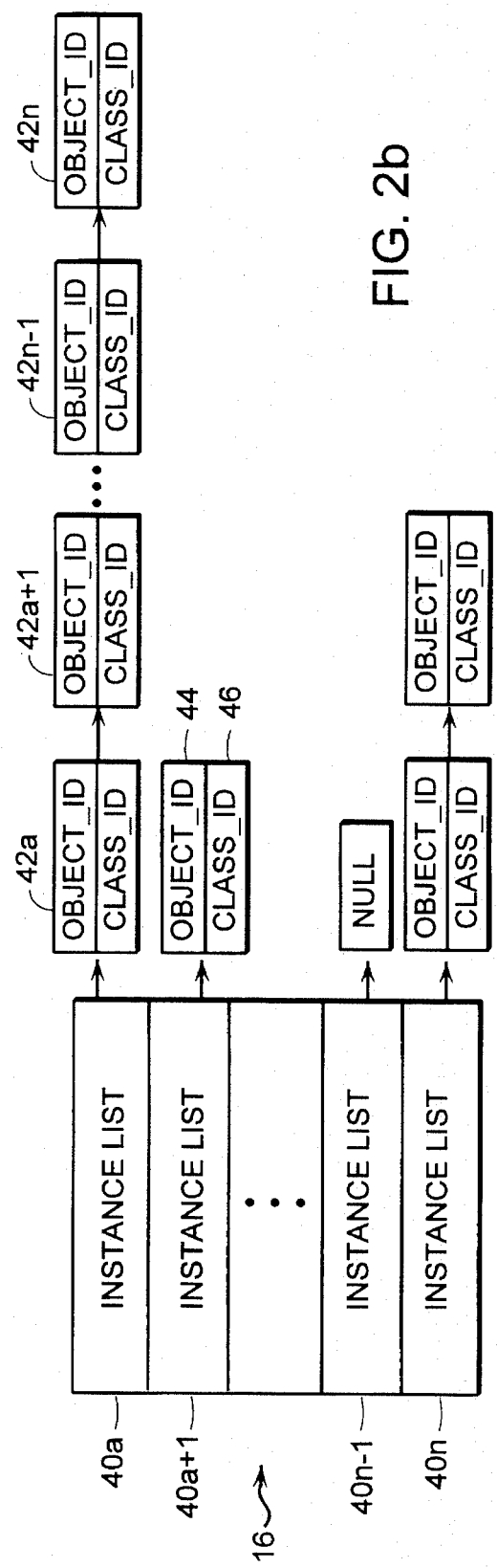

Referring to FIG. 2a, the prototype list 14 includes object descriptors 20a–20n, generally referred by reference numeral 20. Each descriptor 20 contains several fields, including a name field 24, and a type field 26 which, in combination, identify prototypes or generic objects, but which do not identify particular instances of those objects, i.e., actual instantiations of the prototype object as displayed by the application 12. For example, a descriptor 20 in the prototype list can define a scroll bar generically, which can be used in turn to define multiple instances of actual scroll bars, which may be displayed on a display screen.

Also included in each descriptor 20 is an interaction list field 28. The interaction list 28 can be implemented as an array of interaction records 30a–30n, generally referred to by reference numeral 30, or as a pointer to a linked list of these interaction records. In either implementation, each interaction record 30 contains several fields including an action field 32 and a descriptor identification field (desc_id)
34. The action field 32 defines an operation to be performed (which may include, for example, the operations "gray" or "ungray") when an instantiation of the object defined by the descriptor 20 is activated; and the desc_id field 34 identifies an index in the prototype list 14 for another descriptor 20, i.e., an affected object, for example a "menu entry" or "ok button". Together, the contents of the action 32 and desc_id 34 fields identify for the application 12 an action to perform and on what generic object to perform the action, for example "gray menu entry" or "ungray ok button".

However, as noted above and explained below, because within an application 12 there can be multiple processes 18 generating instantiations of objects, there can be multiple instances of a type of object. The application 12, therefore, performs the action 32 on only the instantiations of the affected objects, as identified in the desc_id field 34 of the respective interaction record 30, that are owned by the same process as the activated object. (In alternate embodiments of the present invention, the application 12 may perform the action 32 on all instances of the affected objects. However, the presently preferred embodiment is limited to the former approach.)

In order to properly perform the action 32 in an interaction record 30 on one of potentially many instances of a prototype of the activated object instantiations, the prototype descriptors 20a–20n in the prototype list 14 are organized in a one-to-one correspondence with instance lists 40a–40n, which are generally referred to by reference numeral 40, and which make up the elements of the instantiation list 16. Each instance list 40 can be implemented as an array of zero or more instantiation identifiers 42a–42n, generally referred to by reference numeral 42, or as a linked list of these instantiation identifiers, both the array and the linked list being pointed to by the instance list 40. In either implementation, each instantiation identifier 42 contains several fields including an object_id field 44 that is unique to the instantiation of the object, and a class_id field 46 that is unique to the process which owns the instantiation of the object. As described in detail below, this arrangement makes it possible for the application 12 not only to identify instantiations of the correct prototype object, but also to identify the particular instantiations of these objects, as identified by instantiation identifier 42, and perform actions 32 on only those instantiations of affected objects which are owned by the same process, as identified by the contents of the class_id field 46, which owns the activated object.

The general operation of the system 10 will now be described with reference to FIG. 3. Beginning when a user activates an object by touching it, which can occur, for example by clicking on the object with a mouse, the operator interface 11 determines which of the applications 12 is responsible for the activated object (step 100). The operator interface 11 then notifies the responsible application 12 (step 102) and provides the application 12 with the desc_id and class_id of the instantiation of the activated object. The desc_id is used immediately as an index to directly map into the prototype object list 14 to find the prototype of the activated object; and the class_id is used later to discriminate between instantiations of affected objects in the instantiation list 16. Both notifying applications and providing identifiers are conventional operations in a windowing system.

After receiving the notification from the operator interface 11, the application 12 determines if any other objects are affected by the activation. To determine if any other objects are affected, the application 12 first locates a descriptor 20 in the prototype list 14 whose name and type fields 24 and 26 match the name and type of the activated object (step 104). If the activation of the object does not affect any objects (step 106), that is, if the interaction list 28 of the matching descriptor 20 is empty or null, then no responsive actions are necessary and the application 12 returns to process the next activated object (step 108).

However, if the activation of the object does affect other objects (step 106), that is, if the interaction list 28 contains or points to one or more interaction records 30, the application 12 performs the action identified in the action field 32 in each of the interaction records 30 on those instances of the affected object that are owned by the same process as the activated object, that is, on those instances having the same class_id 46. To do this, the application 12 first locates the activated object's instance list 40 and matches the object_id of the activated object with the contents of an object_id field 44 in an instantiation identifier 42. Since the order of the instance lists 40 in the instantiation list 16 is the same as the order of the prototype descriptors 20 in the prototype list 14, the application 12 uses the location of the prototype descriptor 20 of the prototype object of the activated object to identify the location of the activated object's instance list 40 in the instantiation list 16. Having found the correct instantiation of the activated object, the application 12 then retrieves the contents of the class_id field 46 in the same instantiation identifier 42 which it later uses to determine which process owns an instantiation of an affected object and, thus, discriminate between instantiations.

Next, the application 12 uses the contents of the desc_id field 34 in the interaction record 30 as an index to look up in the prototype list 14 the prototype descriptor 20 of the first affected object (step 110). Having located the descriptor 20 of the affected object, the application 12 next determines if there are any instances of the affected object (step 112). To determine this, the application 12 uses the index of the affected object's descriptor 20 in the prototype list 14 to find the object's corresponding instance list 40 in the instantiation list 16. If there are no instantiations of the affected object (step 112), that is, the instance list 40 is empty or null, the application 12 proceeds to step 118 to determine if there are any other affected objects, that is, any other interaction records 30 left to process.

On the other hand, if there are instances of the affected object, as indicated by the presence of one or more instantiation identifiers 42 in the instance list 40, the application 12 determines which of the instantiations are owned by the same process as the activated object. To do this, the application 12, for each instantiation identifier 42 in the instance list 40, matches the contents of the class_id field 46 of the instantiation of the activated object with the contents of the class_id field 46 of the instantiation identifier 42. When the application 12 finds an instantiation identifier 42 with a matching class_id 46, it performs the action 32 on that instantiation of the affected object (step 116), thereby completing the interaction with that affected object.

Having completed one interaction, the application 12 next determines if the interaction list 28 contains any other interaction records 30 to process for the activated object (step 118). If there are more interaction records 30 to process, the application 12 in step 120 returns to step 112 and proceeds through step 118 as described above. Otherwise, if there are no more interaction records 30 to process, the application 12 returns to process the next activated object (step 122).

While the above description is limited to a specific embodiment of the present invention, it will be apparent that variations and modifications may be made to the invention with the attainment of some or all of the advantages of the invention. For example, the system and method described above could be modified to carry out "cascading" interactions, that is, the activation of an object would cause it to carry out interactions on affected objects and the interactions carried out on the affected objects might in turn cause the system to carry out still further interactions on objects affected by the affected objects. Therefore, it is the object of the following claims to cover all such variations and modifications as come within the true spirit and scope of the invention.

What is claimed is:

1. A digital computer system for using a plurality of objects each of which has at least one instance that is activated during operation of said system, activation of an instance of at least one of said objects affecting other instances of said objects, said system comprising:

A. classification means including a prototype list, said prototype list including one or more object descriptors, each one of said object descriptors associated with an object prototype, each one of said object descriptors including an interaction list, said interaction list having zero or more records, each one of said interaction list records including a descriptor identification field, each said descriptor identification field including an index into said prototype list, each one of said interaction list records including a action field, said action field defining an operation;

B. an operator interface, responsive to a user activating an instance of a first object prototype, for providing an activation identifier, said activation identifier including a descriptor identification field, said descriptor identification field including an index into said prototype list, said index into said prototype list indexing a first one of said object descriptors, said first one of said object descriptors associated with said first object prototype; and C. an application, coupled with said classification means and said operator interface, and responsive to said activation identifier, for performing an action on one or more instances of a second object prototype, said second object prototype associated with a second one of said object descriptors, said second one of said object descriptors indexed by a descriptor identifier within an interaction list record, said interaction list record contained in an interaction list within said first one of said object descriptors, and said action defined by an action field in said interaction list record.

2. The system as defined in claim 18 wherein each said object descriptor in said prototype list further includes a name field and a type field, said name field and said type field in combination identifying said associated prototype for each object descriptor, said operator interface providing a name and a type in said activation identifier as said descriptor identifier in said activation identifier, said name and said type in said activation identifier identifying said object prototype of said first object descriptor, and wherein said application uses said name and said type in said activation identifier to locate said first object descriptor.

3. The system as in claim 2, wherein said classification means further comprises one or more instantiation identifiers, each one of said instantiation identifiers corresponding to one of said instances of said objects, each said instantiation identifier having an object identifier that is unique to said corresponding one of said instances of said objects, each instantiation identifier further having a class entifier that is unique to a process which owns said corresponding one of said instances of said objects.

4. The system as in claim 3, wherein said classification means further comprises one or more lists of said instantiation identifiers, each one of said lists of instantiation identifiers corresponding with one of said object descriptors in said prototype list, and each one of said lists of instantiation identifiers including zero or more instantiation identifiers, each one of said zero or more instantiation identifiers associated with an instance of an object prototype associated with said corresponding one of said object descriptors in said prototype list, and wherein said application is further responsive to said one or more lists of instantiation identifiers to identify said one or more instances of said second object prototype.

5. The system as in claim 4, further comprising:

said activation identifier further includes a class entifier, said class entifier in said activation identifier uniquely indicating an activating process, said activating process owning said instance of said first object prototype; and wherein said application uses said class entifier in said activation identifier to discriminate between said one or more instances of said second object prototype, and said application only performing said action defined by said action field in said interaction list record on those of said one or more instances of said second object prototype having instantiation identifiers including a class entifier equal to said class entifier in said activation identifier.

* * * * *